United States Patent
Hashimoto

(10) Patent No.: US 11,202,213 B2
(45) Date of Patent: Dec. 14, 2021

(54) DEVICE AND METHOD FOR DISTRIBUTING SOFTWARE UPDATE FOR COMMUNICATION DEVICES

(71) Applicant: KDDI CORPORATION, Tokyo (JP)

(72) Inventor: Yoshitsugu Hashimoto, Tokyo (JP)

(73) Assignee: KDDI CORPORATION, Tokyo (JP)

(*) Notice: Subject to any disclaimer, the term of this patent is extended or adjusted under 35 U.S.C. 154(b) by 44 days.

(21) Appl. No.: 16/639,857

(22) PCT Filed: Mar. 16, 2018

(86) PCT No.: PCT/JP2018/010402
§ 371 (c)(1),
(2) Date: Feb. 18, 2020

(87) PCT Pub. No.: WO2019/044008
PCT Pub. Date: Mar. 7, 2019

(65) Prior Publication Data
US 2020/0367071 A1  Nov. 19, 2020

(30) Foreign Application Priority Data
Aug. 31, 2017 (JP) .............................. JP2017-167043

(51) Int. Cl.
*H04W 24/02* (2009.01)
*H04W 76/11* (2018.01)
(Continued)

(52) U.S. Cl.
CPC ............ *H04W 24/02* (2013.01); *H04W 76/11* (2018.02); *H04W 88/08* (2013.01); *H04W 92/20* (2013.01)

(58) Field of Classification Search
CPC ..... H04W 24/02; H04W 76/11; H04W 88/08; H04W 88/02; H04W 88/00; H04W 88/18;
(Continued)

(56) References Cited

U.S. PATENT DOCUMENTS 6,820,259 B1 * 11/2004 Kawamata et al. .......... 717/173
10,505,845 B2 * 12/2019 Au et al. .................. H04L 45/38
(Continued)

FOREIGN PATENT DOCUMENTS

| JP | 2010-199955 A | 9/2010 |
| JP | 2011-192021 A | 9/2011 |
| JP | 2013-045337 A | 3/2013 |

OTHER PUBLICATIONS

International Search Report with English translation issued in corresponding application No. PCT/JP2018/010402 dated Jun. 5, 2018.

*Primary Examiner* — Meless N Zewdu
(74) *Attorney, Agent, or Firm* — Foley & Lardner LLP

(57) ABSTRACT

A distribution device includes an information acquisition part configured to acquire the device identification information to identify a communication device and the base-station identification information to identify a base station attributed to the communication device among a plurality of base stations over a wireless communication network from the communication device, a determination part configured to determine a sequence of distributing software to a plurality of communication devices connectible to the base station based on the device identification information and the base-station identification information with respect to each base station, and a distribution part configured to distribute the software from the base station to a threshold number or less of communication devices according to the sequence determined by the determination part.

14 Claims, 9 Drawing Sheets

(51) Int. Cl.
*H04W 88/08* (2009.01)
*H04W 92/20* (2009.01)

(58) Field of Classification Search
CPC ....... H04W 28/06; H04W 8/24; H04W 92/20; H04W 92/10; H04W 92/08; H04W 92/00; H04W 4/06; H04W 76/40; H04W 4/70; H04W 4/50; H04W 4/30; H04W 4/23; H04W 4/21; G06F 13/00; G06F 16/23; G06F 16/25; G06F 16/2379; H04B 7/24; H04B 7/25; H04B 7/26
See application file for complete search history.

(56) References Cited

U.S. PATENT DOCUMENTS

| | | | |
|---|---|---|---|
| 2004/0049519 A1* | 3/2004 | Itakura et al. | 707/104.1 |
| 2005/0148322 A1* | 7/2005 | Jei | 455/412.1 |
| 2008/0025239 A1* | 1/2008 | Bossoli et al. | 370/312 |
| 2010/0291914 A1* | 11/2010 | Isakssan et al. | 455/419 |
| 2012/0184319 A1 | 7/2012 | Wang | |
| 2014/0364110 A1* | 12/2014 | Rao et al. | H04W 8/245 |
| 2014/0366012 A1* | 12/2014 | Jamadagni et al. | G06F 8/65 |
| 2017/0090906 A1* | 3/2017 | Reynolds | G06F 8/65 |
| 2017/0207956 A1* | 7/2017 | Cabral et al. | H04L 41/082 |

* cited by examiner

FIG. 3

| BASESTATION ID | COMMUNICATION DEVICE ID | DISTRIBUTION STATUS |
|---|---|---|
| 1001 | 0001 | UNEXECUTED |
| 1001 | 0004 | SUCCESS |
| 1001 | 0005 | UNEXECUTED |
| 1001 | 0006 | FAILURE |
| 1001 | 0007 | UNEXECUTED |
| ... | ... | ... |

FIG. 4

| COMMUNICATION DEVICE ID | BASESTATION ID |
|---|---|
| 0001 | 1001 |
| 0002 | 1002 |
| 0003 | 1002 |
| 0004 | 1001 |
| 0005 | 1001 |
| 0006 | 1001 |
| 0007 | 1001 |
| 0008 | 1001 |
| 0009 | 1002 |
| 0010 | 1002 |
| 0011 | 1003 |
| 0012 | 1003 |
| 0013 | 1004 |
| ... | ... |

FIG. 8

| COMMUNICATION DEVICE ID | BASESTATION ID | DEVICE TYPE | ACQUISITION DATE |
|---|---|---|---|
| 0001 | 1001 | MOBILE | 2017/8/1 8:00 |
| 0002 | 1002 | MOBILE | 2017/8/1 8:00 |
| 0003 | 1002 | MOBILE | 2017/8/1 8:00 |
| 0004 | 1001 | MOBILE | 2017/8/1 8:00 |
| 0005 | 1001 | MOBILE | 2017/8/1 8:00 |
| 0006 | 1001 | MOBILE | 2017/8/1 8:00 |
| 0007 | 1001 | FIXED | 2017/8/1 8:00 |
| 0008 | 1001 | FIXED | 2017/8/1 8:00 |
| 0009 | 1002 | FIXED | 2017/8/1 8:00 |
| 0010 | 1002 | FIXED | 2017/8/1 8:00 |
| 0011 | 1003 | FIXED | 2017/8/1 8:00 |
| 0012 | 1003 | FIXED | 2017/8/1 8:00 |
| 0013 | 1004 | FIXED | 2017/8/1 8:00 |
| ... | ... | ... | ... |

DEVICE AND METHOD FOR DISTRIBUTING SOFTWARE UPDATE FOR COMMUNICATION DEVICES

TECHNICAL FIELD

The present invention relates to a distribution device and a distribution method for distributing software to communication devices.

The present application claims the benefit of priority on Japanese Patent Application No. 2017-167043 filed on Aug. 31, 2017, the subject matter of which is hereby incorporated herein by reference.

BACKGROUND ART

Various devices configured to distribute software to multiple communication devices have been known. Patent Document 1 discloses a technology of a distribution device configured to carry out broadcast transmission of software to multiple communication devices.

CITATION LIST

Patent Literature Document

Patent Document 1: Japanese Patent Application Publication No. 2010-199955

SUMMARY OF INVENTION

Technical Problem

Recently, due to the propagation of the IoT (Internet of Things) technology, IoT devices configured to receive or transmit data with external servers through networks have been rapidly increasing in number. Since IoT devices should be reduced in power consumption for communication, IoT devices may need to use wireless communication lines capable of transmitting small amounts of data at lower communication speed than other communication devices mounted on personal computers, smartphones, and the like.

When deficiencies are revealed in software executed by IoT devices, product manufacturers or communication carriers should provide the updating software to eliminate deficiencies of software. Using the technology of FOTA (Firmware Over the Air), for example, it is possible to automatically update the software of IoT devices without human hands. Using the conventional technology, it is possible to distribute the updating software to multiple IoT devices. However, it takes a long time to distribute the updating software having a larger data size than an amount of data to be received or transmitted with IoT devices in normal operations. In this case, it is possible to transmit the updating software to numerous IoT devices in a broadcast manner, however, which may suppress communication bands of base stations so as to affect communication devices or other IoT devices.

The present invention is made in consideration of the aforementioned problem, and therefore the present invention aims to update the software with communication devices serving as updated subjects without affecting other communication devices connected to base stations.

Solution to Problem

In a first aspect of the present invention, a distribution device includes an information acquisition part configured to acquire the device identification information to identify a communication device and the base-station identification information to identify a base station attributed to the communication device among a plurality of base stations over a wireless communication network from the communication device; a determination part configured to determine a sequence of distributing software to a plurality of communication devices connectible to the base station based on the device identification information and the base-station identification information with respect to each base station, and a distribution part configured to distribute the software from the base station to a threshold number or less of communication devices according to the sequence determined by the determination part.

Upon a completion of distributing the software to one or more communication devices among a plurality of communication devices while distributing the software to a prescribed number equivalent to the threshold number of the communication devices, the distribution part may start to distribute the software to one or more communication devices selected from among a plurality of communication devices according to the sequence.

The distribution part may determine the threshold number based on the size of the software. The distribution part may determine the threshold number based on a time to distribute the software. The distribution part may determine the threshold number based on the type of the base station.

When the distribution part is unable to start distributing the software to the communication device before the predetermined time lapses after acquisition of the base-station identification information from the communication device, the information acquisition part may reacquire the base-station identification information of the base station attributed to the communication device.

When the first base-station identification information previously acquired by the information acquisition part differs from the second base-station identification information reacquired by the information acquisition part, the determination part may redetermine the sequence with respect to a first base station which is attributed to the communication device when the information acquisition part acquires the first base-station identification information and a second base station which is attributed to the communication device when the information acquisition part acquires the second base-station identification information.

When the communication device is a mobile communication device, the information acquisition part may reacquire the base-station identification information of the base station attributed to the communication device the predetermined time before distribution of the software by the distribution part.

The information acquisition part may determine the predetermined time based on the number of mobile communication devices connectible to the base station.

The determination part may determine the sequence at an earlier timing when a ratio of mobile communication devices to a plurality of communication devices connectible to the base station is less than a threshold value rather than when the ratio of mobile communication devices is equal to or above the threshold value.

The determination part may determine the sequence after a ready to distribute the software when the ratio of mobile communication devices to a plurality of communication devices connectible to the base station is equal to or above the threshold value.

When a predetermined number or more of communication devices serving as software-distributed subjects is located in a predetermined area covering a plurality of base stations, the distribution part may distribute the software from a plurality of base stations to the threshold number or less of communication devices according to the sequence determined by the determination part.

The distribution part may distribute the software at a timing at which the communication device does not execute a predetermined application.

In a second aspect of the present invention, a distribution method includes the steps of: acquiring the device identification information to identify a communication device and the base-station identification information to identify a base station attributed to the communication device among a plurality of base stations over a mobile telephone network from the communication device; determining a sequence of distributing software to a plurality of communication devices connectible to the base station based on the device identification information and the base-station identification information with respect to each base station; and distributing the software to a threshold number or less of communication devices correlated to the base station according to the determined sequence.

Advantageous Effects of Invention

According to the present invention, it is possible to provide advantageous effects of updating the software with communication devices serving as updated subjects without affecting other communication devices connected to base stations.

BRIEF DESCRIPTION OF DRAWINGS

FIG. 3 shows a table describing the configuration of a distribution-status database according to the first embodiment.

FIG. 4 shows a table describing the configuration of a distribution-queue database according to the first embodiment.

FIG. 8 shows a table describing the configuration of a distribution-queue database according to the second embodiment.

DESCRIPTION OF EMBODIMENTS

First Embodiment

Overview of Software Distribution Method

Figure 1:
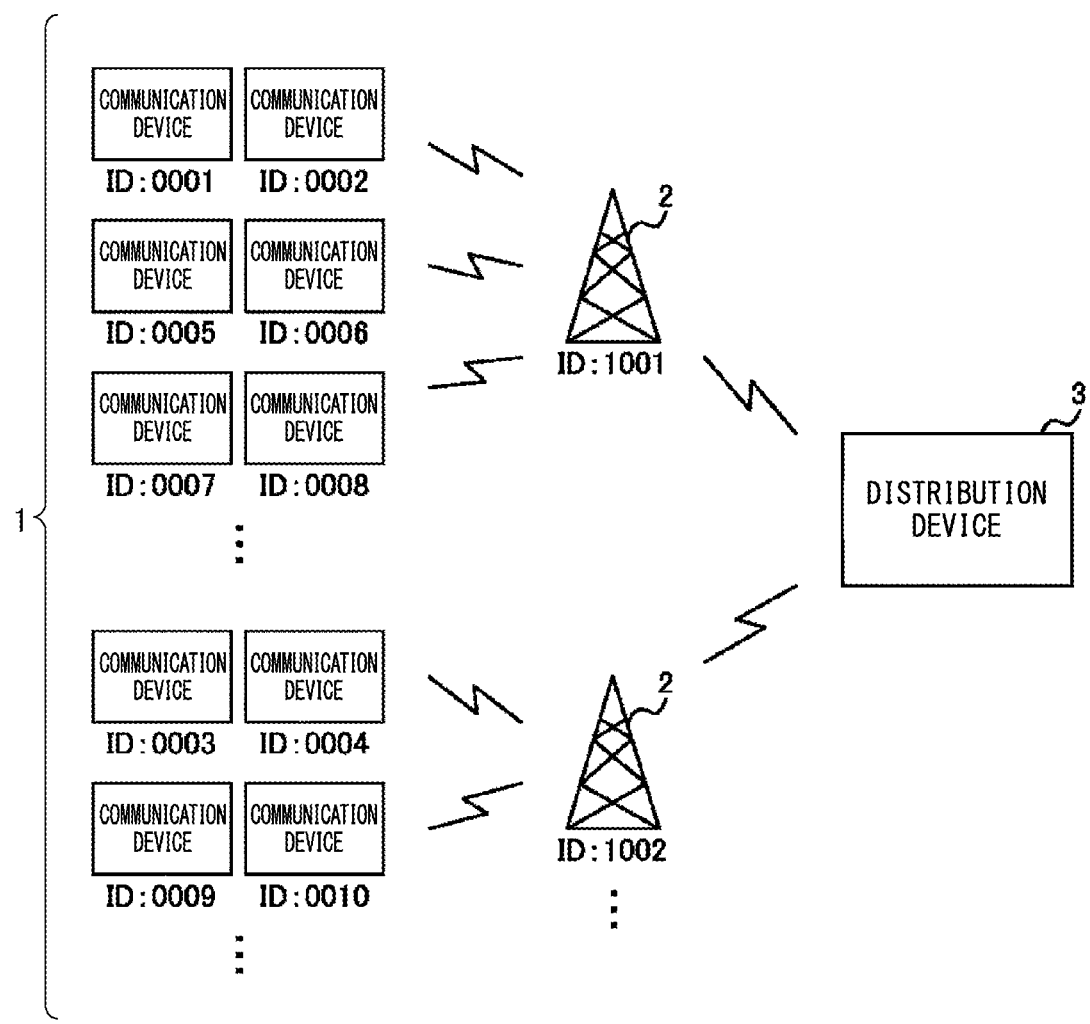
FIG. 1 is a schematic diagram showing the overview of a software distribution method according to the first embodiment.

FIG. 1 is a schematic diagram used to explain the overview of a software distribution method according to the first embodiment. FIG. 1 shows a distribution device 3 configured to receive or transmit data with communication devices 1 via base stations 2.

The communication device 1 is configured of a device to receive or transmit data with a server or another communication device 1, e.g. an IoT device or a device conforming to the M2M (Machine to Machine), i.e. a machine-to-machine communication allowing multiple devices to mutually communicate with each other without human hands. For example, the communication device 1 is configured of a smart meter including a communication module to measure power usage rates or home appliances which can be operated via the Internet. The present embodiment refers to the communication device 1 as a fixed device which may not be moved from its setup location.

The base station 2 plays a role as a repeater to repeat communication between the communication device 1 and the distribution device 3. For example, wireless communication networks refer to mobile-phone networks or LPWA (Low Power Wide Area) used for communication with IoT devices, specifically, which may be NB-IoT (Narrow Band-IoT), LoRaWAN (a registered trademark), SIGFOX (a registered trademark), or the like.

The distribution device 3 is a FOTA server to control software distribution. For example, the distribution device 3 is configured of a PC (Personal Computer). Herein, the distribution device 3 is configured to distribute software including updating software to update the installed software of the communication device 1 and additional software to add functions to be executed by the communication device 1. The present specification mainly refers to the updating software as the software distributed by the distribution device 3.

The distribution device 3 may be divided into a provider server configured to provide the updating software and a FOTA server configured to control the distribution of the updating software. In this case, a communication carrier may set up the FOTA server while a communication carrier or a manufacture of each communication device 1 may set up the provider server. The present specification refers to the distribution device 3 as a server managed by a communication carrier, i.e. a single server sharing the functions of the provider server and the FOTA server.

When the distribution server 3 shown in FIG. 1 is about to distribute the updating software, the distribution device 3 transmits a response request to each of multiple communication devices 1 which are stored in advance as distributed subjects. Upon receiving the response request, the communication device 1 transmits to the distribution device 3 a communication-device ID (Identification) representing the device-identification information of the communication device 1 and a base-station ID representing the identification information of the base station 2 which the communication device 1 belongs to among multiple communication devices 1 over wireless communication networks.

In this connection, the concurrent connection count for each type of wireless communication line is set to the base station 2. For this reason, when the concurrent connection count of the PLWA, i.e. one wireless communication line attributed to the base station 2, reaches its upper-limit value due to the distribution of the updating software, the communication device 1 conducting communication in its normal operation cannot be connected to the LPWA. Upon receiving the communication-device ID and the base-station ID from the communication device 1, the distribution device 3 determines a sequence of distributing the updating software to the communication device 1 for each base station 2 based on the communication-device ID and the base-station ID, according to which the base station 2 distributes the updating software to the prescribed number of communication devices 1 which is equal to or less than a threshold number of communication devices 1.

It is assumed that the threshold number of communication devices 1, which a single base station 2 can distribute the updating software to, is set to "5" in an ascending order of the communication-device IDs of the communication devices 1. The threshold number used to distribute the updating software indicates the number of communication devices 1 to which the base station 2 can concurrently distribute the updating software using the LPWA. According to the LPWA, numerous devices may share the limited radio communication bands, wherein the communication device 1 is wirelessly connected to the base station 2 during a data transmission period alone. In this connection, the threshold number is equal to the number of radio channels which can be used by the base station 2 to distribute the updating software.

Assuming that the threshold number is five, the distribution device 3 shown in FIG. 1 may start to concurrently distribute the updating software from the base station 2 to five communication devices 1 having the communication-device IDs "0001" through "0007" among all the communication devices 1 attributed to the base station 2 having the base-station ID "1001" or to distribute the updating software by changing its distribution-start time according to the order of communication-device IDs. Upon completion of receiving the updating software, the communication device 1 notifies the distribution device 3 of the resultant information representing the completion of reception. Upon receiving the resultant information representing the completion of receiving the updating software from the communication device 1, the distribution device 3 determines a completion of distributing the updating software to the communication device 1.

Upon receiving the resultant information representing the completion of receiving the updating software from the communication device 1, the distribution device 3 distributes the updating software to other communication devices 1 to which the updating software has not been distributed. Upon receiving the resultant information representing a completion of receiving the updating software from a single communication device 1, for example, the distribution device 3 distributes the updating software from the base station 2 to the communication device 1 having the communication-device ID "0008" serving as a next order of priority among other communication devices 1 to which the updating software has not been distributed. The distribution device 3 controls other base stations 2 such as the base station 2 having the base-station ID "1002" similar to the base station 2 having the base-station ID "1001" to distribute the updating software to the prescribed number of communication devices 1 without exceeding the threshold number of communication devices 1.

As described above, the distribution device 3 is configured to control the number of base station devices 2 to which each base station 2 may distribute the updating software, and therefore it is possible to update the software with numerous communication devices 1 serving as updated subjects without affecting other communication devices connected to the base station 2. Hereinafter, the details of the distribution device 3 will be described below.

Configuration of Distribution Device 3

Figure 2:
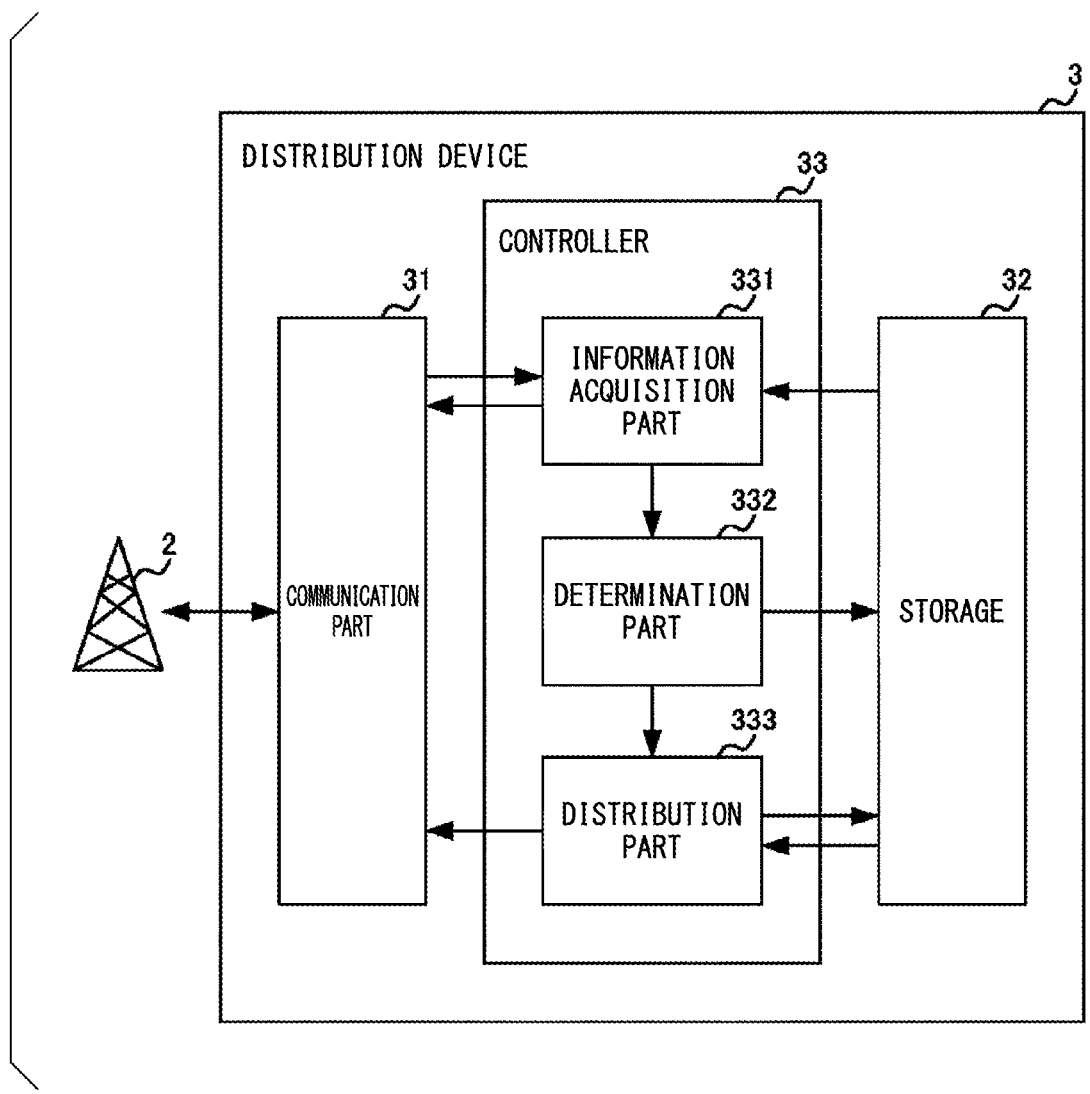
FIG. 2 is a block diagram showing the configuration of a distribution device according to the first embodiment.

FIG. 2 is a block diagram showing the configuration of the distribution device 3 according to the first embodiment. The distribution device 3 includes a communication part 31, a storage 32, and a controller 33.

The communication part 31 includes a wireless communication controller configured to receive or transmit data with the communication device 1 via the base station 2.

For example, the storage 32 may be a ROM (Read-Only Memory), a RAM (Random-Access Memory), or storage media such as hard disks. The storage 32 is configured to store various types of programs executed by the controller 33. The storage 32 stores the updating software and a distributed-subject list indicating a list of communication-device IDs identifying the communication devices 1 serving as distributed subjects of updating software. In addition, the storage 32 stores the communication-device IDs of the communication devices 1, to which the updating software be distributed, on a distribution-status data base (hereinafter, simply referred to as a distribution-status DB (Database)) while storing the communication-device IDs of the communication devices 1, to which the updating software has not been distributed yet, on a distribution-queue database (hereinafter, simply referred to as a distribution-queue DB).

FIG. 3 shows a table describing the configuration of the distribution-status DB according to the first embodiment. As shown in FIG. 3, the distribution-status DB is configured to store a correlation between the base-station ID, the communication-device ID of the communication device 1 attributed to the base-station ID, and the distribution status, i.e. the distribution status of the updating software. In the distribution-status DB, the communication device 1 may have records indicating whether the updating software can be distributed to the communication device 1 or whether the updating software is being distributed to the communication device L Herein, records are made up of combinations of data representing the base-station ID, the communication-device ID, and the distribution status as well as combination of data representing the communication-device ID and the base-station ID, which will be described later in conjunction with FIG. 4.

For example, the distribution status may indicate "UNEXECUTED", "SUCCESS", or "FAILURE". Herein, "UNEXECUTED" indicates that the updating software can be distributed to the communication device 1 or that the updating software is being distributed to the communication device 1. In addition, "SUCCESS" indicates a completion of distributing the updating software. That is, it indicates that the communication device 1 completes receiving the updating software. Moreover, "FAILURE" indicates an incompletion of distributing the updating software, i.e. it indicates that the communication device 1 fails to complete reception of the updating software. The distribution-status DB may be configured of a single DB intermingling multiple base-station IDs or a single DB for each base-station ID. The present embodiment refers to a single distribution-status DB intermingling multiple base-station IDs.

FIG. 4 shows a table describing the configuration of the distribution-queue DB according to the first embodiment. As shown in FIG. 4, the distribution-queue DB is configured to store a correlation between the communication-device ID and the base-station ID of the base station 2 attributed to the communication device 1 having the communication-device ID. In the distribution-queue DB, the communication device 1 may have records indicating that the updating software 1 has not been distributed thereto yet. In an initial condition, the distribution-queue DB stores the communication-device IDs described in the distribution-subject list as well as the base-station IDs as blanks, and therefore the distribution-queue DB may store the base-station ID upon acquiring the base-station ID from the communication device 1 with an information acquisition part 331 which will be described later.

Returning to FIG. 2, for example, the controller 33 is configured of a CPU (Central Processing Unit). The controller 33 is configured to execute programs stored on the storage 32 and to thereby control the function of the distribution device 3. By executing programs, the controller 33 may achieve the functions of an information acquisition part 331, a determination part 332, and a distribution part 333.

The information acquisition part 331 is configured to receive or transmit data with the communication device 1 via the communication part 31. Specifically, the information acquisition part 331 transmits a response request to the communication device 1 via the communication part 31 according to the list information of communication-device IDs stored on the storage 32. In addition, the information acquisition part 331 acquires from the communication device 1 via the communication part 31 its communication-device ID and a base-station ID to identify the base station 2 attributed to the communication device 1 among multiple base stations 2 over wireless communication networks.

The information acquisition part 331 is configured to acquire the resultant information as to whether or not the communication device 1 completes reception of the updating software distributed thereto. The information acquisition part 331 applies to the determination part 332 the communication-device ID and the base-station ID acquired from the communication device 1 as well as the resultant information.

The determination part 332 is configured to determine a sequence of distributing the software to multiple communication devices 1 attributed to each base station 2 based on the communication-device IDs and the base-station ID. Based on the communication-device ID and the base-station ID input from the information acquisition part 331, for example, the determination part 332 determines a sequence of communication devices 1 for each base station 2 to which the updating software be distributed, and then the determination part 332 resorts the order of records stored on the distribution-queue DB according to the determined sequence. The sequence of distributing software may be ascribed to the order of communication-device IDs or the order of dates to acquire data from the communication devices 1. The present embodiment sets the sequence of distributing software to an ascending order of communication-device IDs.

The determination part 332 may update the distribution-status DB according to the resultant information input thereto from the information acquisition part 331. Specifically, the determination part 332 updates the distribution status of the communication-device ID included in the resultant information among records stored on the distribution-status DB according to the resultant information input thereto from the information acquisition part 331. In this connection, the determination part 332 sets the distribution status to "SUCCESS" when the resultant information indicates a completion of receiving the updating software, while the determination part 332 sets the distribution status to "FAILURE" when the resultant information indicates an incompletion of receiving the updating software.

The distribution part 333 distributes the updating software from the base station 2 to the prescribed number of communication devices 1, which is equal to or less than the threshold number, according to the sequence determined by the determination part 333. Specifically, the distribution part 33 extracts the prescribed number of records, which is equal to or less than the threshold number, from the distribution-queue DB, which stores records according to the sequence determined by the determination part 332, with respect to each of multiple base stations 2, thus storing the extracted records on the distribution-status DB according to the sequence determined by the determination part 332. Next, the distribution part 333 distributes the updating software stored on the storage 32 from the base station 2 to the communication devices 1 in the order of records stored on the distribution-status DB.

When the threshold number is set to five with respect to a single base station 2, the distribution part 333 extracts an upper-order of five records for each of multiple base stations 2 among the records stored on the distribution-queue DB according to the sequence determined by the determination part 332, thus storing the extracted recodes on the distribution-status DB. Next, the distribution part 333 distributes the updating software from the base station 2 to the communication devices 1 in an order of records stored on the distribution-status DB.

The distribution part 333 may determine the threshold number based on the size of the updating software. For example, it is possible to reduce the threshold number in units of 100 kilo-bytes such that the threshold number ascribed to a single base station 2 would be reduced to four by decreasing one when the size of the updating software exceeds 100 kilo-bytes or the threshold number would be reduced to three by decreasing two when the size of the updating software exceeds 200 kilo-bytes. In this case, when the size of the updating software is 200 kilo-bytes, the distribution part 333 distributes the updating software from the base station 2 to an upper-order of three communication devices 1 for each of multiple base stations according to the sequence determined by the determination part 332. Accordingly, even when the updating software has a larger size, it is possible to prevent the communication capacity of the base station from being tightened.

The distribution part 333 may determine the threshold number based on the time to distribute the updating software. For example, the distribution part 333 may reduce the threshold number of communication devices 1, to which the updating software be distributed, in a time zone causing a larger amount of communication in the LPWA, while the distribution part 333 may increase the threshold number in another time zone causing a smaller amount communication. Accordingly, it is possible to prevent the base station 2 from being affected in communication due to the distribution of the updating software.

The distribution part 333 may determine the threshold number based on the type of the base station 2. When the concurrent connection count differs according the type of the base station 2, for example, the distribution part 333 may determine the threshold number based on the type of the base station. Accordingly, it is possible to prevent the base station 2 from being affected in communication due to the distribution of the updating software.

The distribution part 333 may distribute the updating software at the timing at which the communication device 1 does not execute a predetermined application. When the communication device 1 does not execute a predetermined application in a late-night time zone, for example, the distribution part 333 may distribute the updating software at the timing at which the communication device 1 does not execute the predetermined application, i.e. a late-night time zone.

Upon acquiring the operation time information representing an operation time of an application from an unillustrated application server configured to manage the communication device 1, for example, the distribution part 333 may determine whether or not the communication device 1 is executing a predetermined application. In this case, the distribution part 333 may distribute the updating software at the prescribed timing other than the operation time indicated by the operation time information which the information acquisition part 331 acquires from the application server. Alternatively, the distribution part 333 may transmit a response request to the communication device 1 so as to determine whether or not the communication device 1 is executing an application based on the response information which is received from the communication device 1 in reply to the response request and which include the operation information representing whether or not the communication device 1 is executing an application. In this case, the distribution part 333 does not distribute the updating software when the operation information included in the response information indicates an execution of an application in progress. The distribution part 333 may distribute the updating software when the operation information indicates a nonexecution of an application. Accordingly, it is possible to prevent the communication device 1 conducting its normal operation from being affected due to the distribution of the updating software.

Upon a completion of distributing the updating software to one or more communication devices 1 among multiple communication devices 1 while distributing the updating software to the prescribed number of communication devices 1 corresponding to the threshold number of communication devices 1, the distribution part 333 starts to distribute the updating software to one or more communication devices 1, which are selected from among multiple communication devices 1, according to the sequence determined by the determination part 332. When the threshold number indicates five communication devices 1 attributed to a single base station 2, for example, it is assumed that the distribution part 333 may complete distributing the updating software to two communication devices 1 attributed to a certain base station 2.

In this case, the distribution part 333 may firstly extract an upper-order of two records ascribed to the base station 2 from the records stored on the distribution-queue DB according to the sequence determined by the determination part 332 and thereby store the extracted records on the distribution-status DB. Next, the distribution part 333 may distribute the updating software from the base station 2 to two communication devices 1 corresponding to the extracted records in the order of the records stored on the distribution-status DB. Accordingly, irrespective of the existence of numerous communication devices 1 serving as updated subjects, it is possible to sequentially update the software with all the communication devices 1 without affecting the base station 2 conducting other communications.

The distribution part 333 is configured to update the distribution-status DB and the distribution-queue DB based on the distribution status of the distribution-status DB. Specifically, the distribution part 333 may delete the record of the communication device 1 from the distribution-status DB when the distribution status is "SUCCESS", i.e. when the information acquisition part 331 acquires the resultant information from the communication device 1 indicating a completion of receiving the updating software. On the other hand, the distribution part 333 may extract the record of the communication device 1 from the distribution-status DB to thereby store the extracted record on the distribution-queue DB when the distribution status is "FAILURE", i.e. when the information acquisition part 331 acquires the resultant information from the communication device 1 indicating an incompletion of receiving the updating software. When the distribution status is "FAILURE", the distribution part 333 may store the record extracted from the distribution-status DB at the last end of a queue of the distribution-queue DB or the distribution part 333 may store the extracted record on the distribution-queue DB in an ascending order of communication-device IDs. When the distribution-status DB has no records, i.e. when the distribution-status DB shows nonexistence of communication devices 1 serving as distributed subjects, the distribution part 333 may determine a completion of distributing the updating software to all the communication devices 1 serving as distributed subjects.

Process of Distribution Device 3

Figure 5:
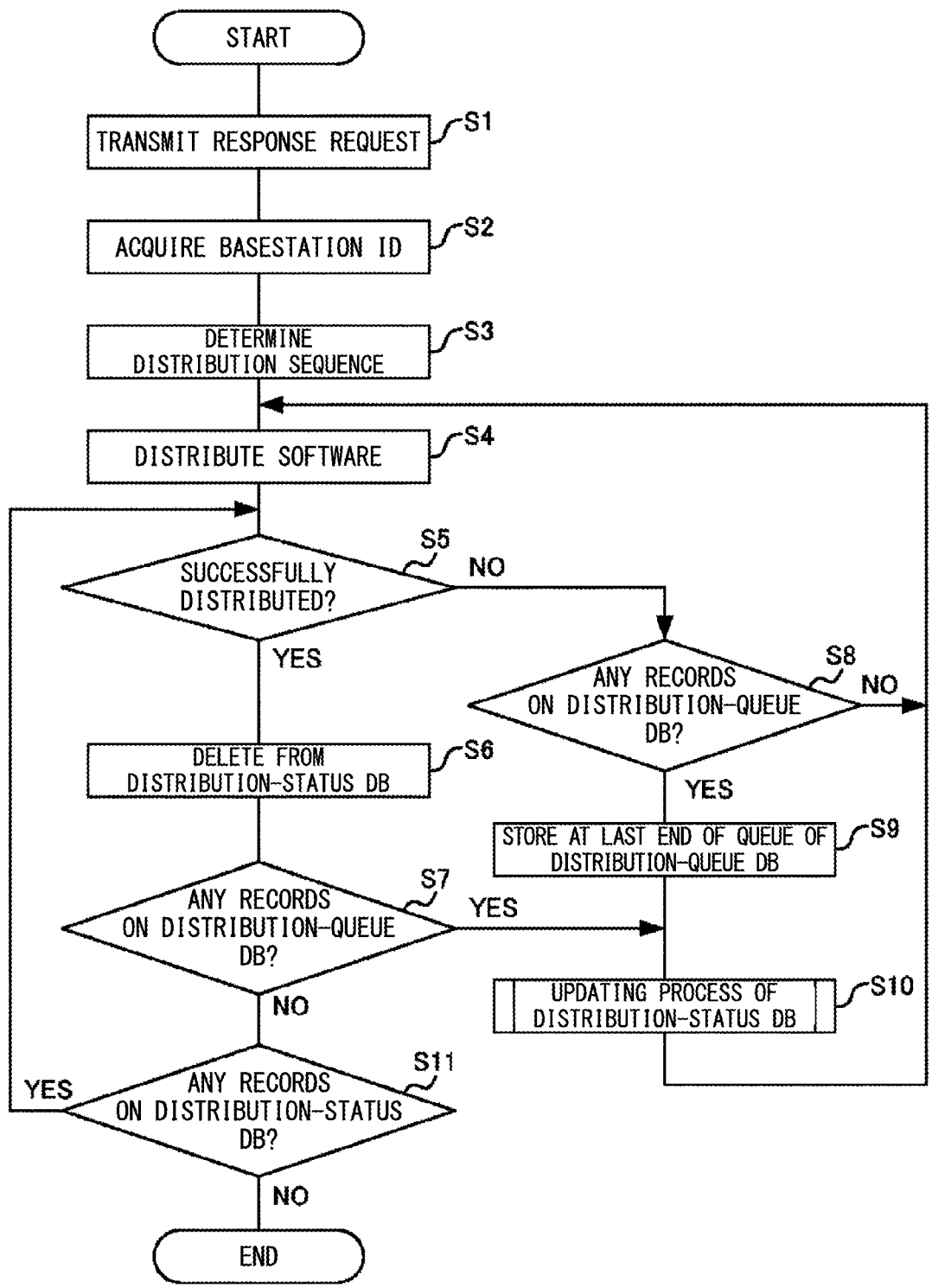
FIG. 5 is a flowchart showing a flow of processing executed by the distribution device according to the first embodiment.

Next, a flow of processing executed by the distribution device 3 will be described below. FIG. 5 is a flowchart showing a flow of processing executed by the distribution device 3 according to the first embodiment. The flowchart starts its steps when triggered by a manager of the distribution device 3 to store the updating software on the storage 32.

The information acquisition part 331 transmits a response request to the communication device 1 via the communication part 31 according to the list information of communication-device IDs stored on the storage 32 (S1). Responsive to the response information transmitted by each of the communication devices 1 receiving the response request, the information acquisition part 331 acquires the base-station ID included in the response information via the communication part 31 (S2). Specifically, the information acquisition part 331 acquires the communication-device ID and the base-station ID from the communication device 1. The information acquisition part 331 acquires and inputs the communication-device ID and the base-station ID to the determination part 332.

Figure 6:
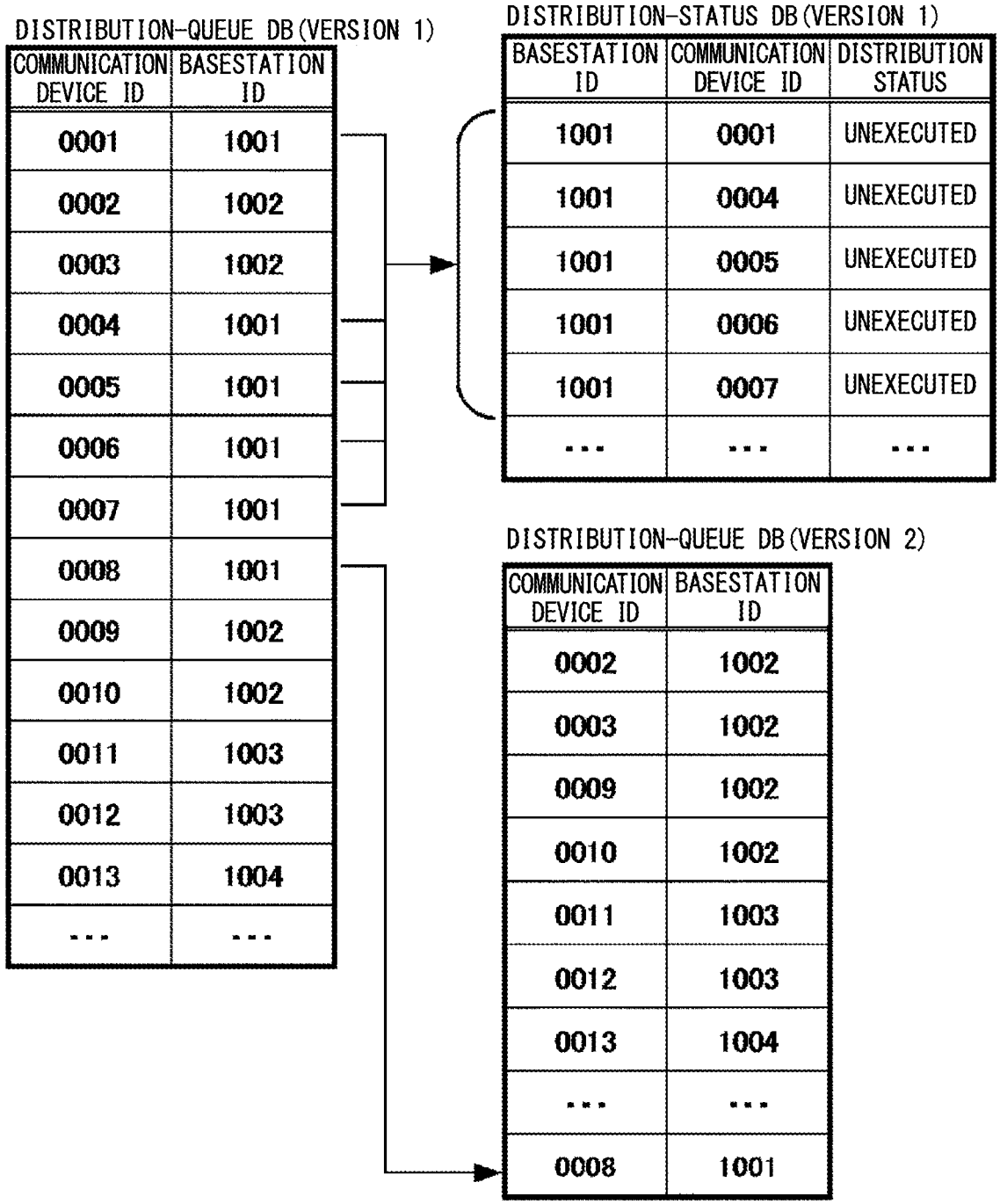
FIG. 6 shows tables used to explain a flow of a distribution process according to the first embodiment.

The determination part 332 determines a sequence of communication devices 1, to which the updating software be distributed, based on the communication-device ID and the base-station ID input by the information acquisition part 331 (S3). FIG. 6 show tables used to explain a distribution process according to the first embodiment. The determination part 332 resorts a sequence of communication devices 1 in an ascending order of communication-device IDs and thereby stores the resorted sequence on the distribution-queue DB of version 1 shown in FIG. 6 such that the communication-device IDs are each correlated to the base-station ID.

Returning to FIG. 5, the distribution part 333 distributes the updating software from the base station 2 to the prescribed number of communication devices 1, which is equal to or less than the threshold number, according to the sequence determined by the determination part 332 (S4). When the threshold number indicates five communication devices 1 attributed to a single base station 2, for example, the distribution part 333 firstly extracts an upper-order of five records ascribed to the base-station ID "1001" from the distribution-queue DB of version 1 shown in FIG. 6 so as to store the extracted records on the distribution-status DB of version 1. The distribution part 333 deletes the extracted records from the distribution-status DB of version 1 and then stores the record of the communication-device ID "0008", which indicates the communication device 1 exceeding the threshold number, at the last end of a queue of the distribution-queue DB of version 2. Next, the distribution part 333 starts to distribute the updating software from the base station 2 to the communication devices 1 having the records stored on the distribution-status DB of version 1. The distribution part 333 carries out the same process for other communication devices 1 attributed to the other base station 2.

Returning to FIG. 5, when the communication device 1 having received the updating software distributed thereto transmits the resultant information as to whether or not reception is completed, the determination part 332 determines whether or not to successfully distribute the updating software based on the resultant information (S5). Specifically, the information acquisition part 331 firstly acquires the resultant information from the communication device 1 to input the resultant information to the determination part 332. Next, the determination part 332 updates the distribution-status DB based on the resultant information input by the information acquisition part 331.

Figure 7:
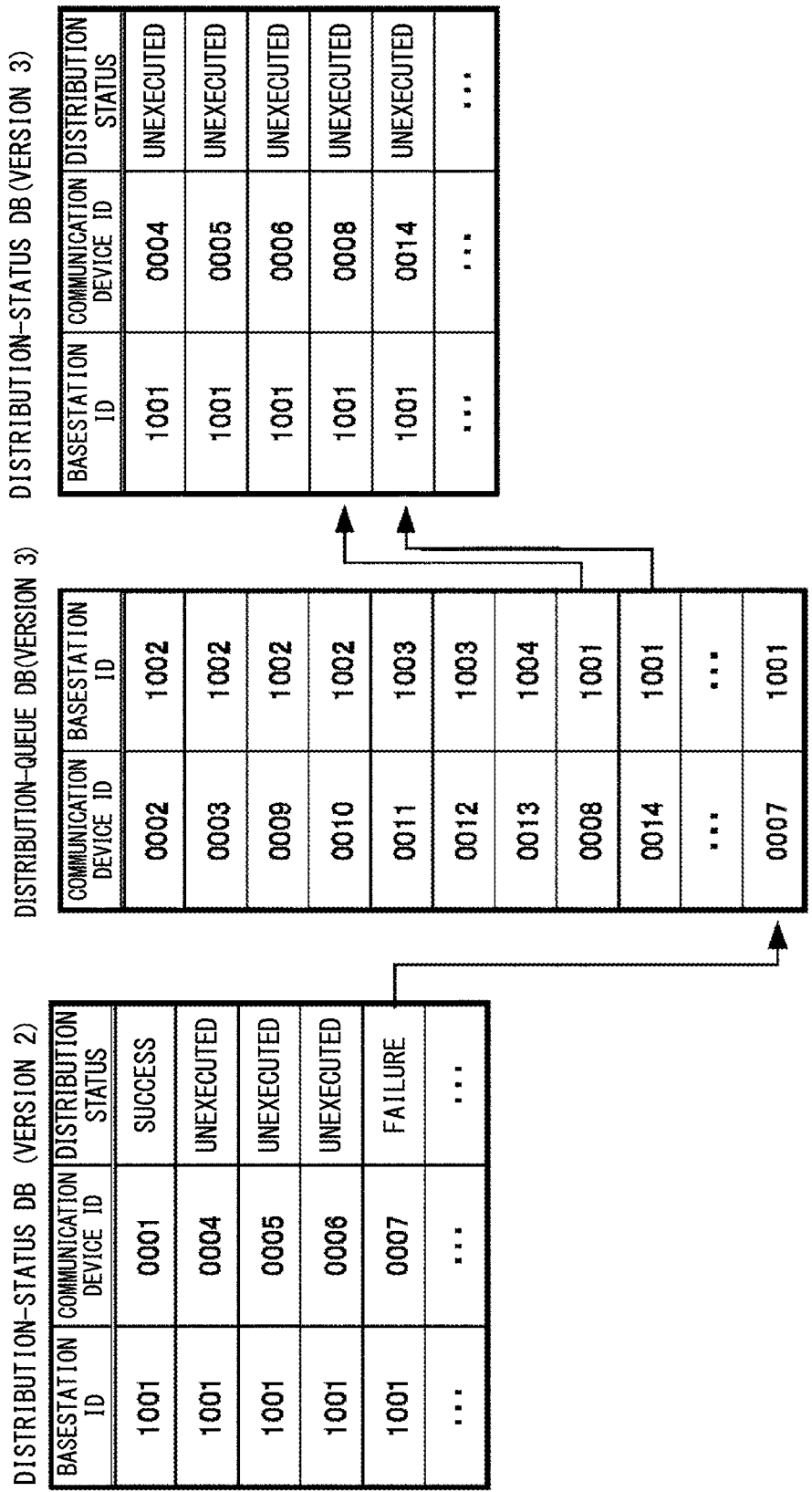
FIG. 7 shows tables used to explain another flow of a distribution process according to the first embodiment.

FIG. 7 shows tables used to explain a distribution process according to the first embodiment. When the communication device 1 having the communication-device ID "0001" transmits the resultant information indicating a completion of reception, for example, the determination part 332 updates the distribution status of the communication-device ID "0001" to "SUCCESS" with the distribution-status DB of version 2.

On the other hand, when the communication device 1 having the communication-device ID "0007" transmits the resultant information indicating an incompletion of reception, the determination part 332 updates the distribution status of the communication-device ID "0007" to "FAILURE" with the distribution-status DB of version 2. Returning to FIG. 5, the determination part 332 may proceed to the process of S6 upon determining successful distribution, while the determination part 332 proceeds to the process of S8 upon determining failed distribution.

Upon determining successful distribution, the distribution part 333 deletes the record of the communication device 1 indicating the successful distribution from the distribution-status DB (S6). Specifically, the distribution part 333 deletes the record indicating the distribution status of "SUCCESS" from the distribution-status DB. Subsequently, the distribution part 333 determines whether or not the distribution-queue DB has any records (S7). The distribution part 333 proceeds to S10 upon determining the existence of any records on the distribution-queue DB, while the distribution part 333 proceeds to S11 upon determining the nonexistence of any records on the distribution-queue DB.

When the determination part 332 determines a failure of distributing the updating software in S5, the distribution part 333 determines whether or not any records are registered in the distribution-queue DB (S8). Upon determining the existence of any records on the distribution-queue DB, the distribution part 333 proceeds to S9. On the other hand, the distribution part 333 returns its processing to S4 upon determining the nonexistence of any records on the distribution-queue DB, i.e. the nonexistence of the communication devices 1 to which the updating software has not be distributed, and therefore the distribution part 333 will redistribute the updating software to the communication device 1 undergoing a failure of distributing the updating software.

Upon determining the existence of any records on the distribution-queue DB in S8, the distribution part 333, the distribution part 333 extracts the record of the communication device 1 undergoing a failure of distributing the updating software from the distribution-status DB so as to store the extracted record at the last end of a queue of the distribution-queue DB (S9). Specifically, the distribution part 333 extracts the record indicating the distribution status of "FAILURE" from the distribution-status DB shown in FIG. 7 so as to store the extracted record at the last end of a queue of the distribution-queue DB of version 3. The distribution part 333 deletes the extracted record from the distribution-status DB.

Subsequent to S9 or when determining the existence of any records on the distribution-queue DB in S7, the distribution part 333 carries out an update process with the distribution-status DB (S10). Specifically, upon a completion of distributing the updating software to one or more communication devices 1 among multiple communication devices 1 during an operation of distributing the updating software to the prescribed number of communication devices 1, which is equal to the threshold number of communication devices 1, the distribution part 333 starts to distribute the updating software to one or more communication devices 1 among multiple communication devices 1 according to the sequence determined by the determination part 332.

In the distribution-status DB of version 2 shown in FIG. 7, it is assumed that the updating software has been completely distributed to two communication devices 1 having the communication-device IDs "0001" and "0007". In this case, the distribution part 333 extracts an upper-order of two records among the records ascribed to the base-station ID "1001" from the distribution-queue DB of version 3 so as to store the extracted records on the distribution-status DB of version 3. Next, the distribution part 333 returns its processing to S4 so as to start distributing the updating software from the base station 2 to the two communication devices 1 corresponding to the records stored on the distribution-status DB.

Upon determining the nonexistence of any records on the distribution-queue DB in S7, the distribution part 333 determines whether or not any records are registered in the distribution-status DB (S11). Upon determining the existence of any records on the distribution-status DB, the distribution part 333 returns its processing to S5. The distribution part 333 exits its processing upon determining the nonexistence of any records on the distribution-status DB, i.e. upon determining a completion of distributing the updating software to all the communication devices 1 serving as distributed subjects due to reception of the resultant information indicating a completion of reception from all the communication devices 1 serving as distributed subjects.

Effect of First Embodiment

As described above, the distribution device 3 is configured to determine a sequence of distributing the updating software with respect to each base station 2 and to thereby distribute the updating software from the base station 2 to the prescribed number of communication devices 1, which is equal to or less than the threshold number of communication devices 1. Upon determining a completion of distributing the updating software due to reception of the resultant information indicating a completion of reception from one or more communication devices 1 among multiple communication devices 1, to which the updating software is being distributed, the distribution device 3 may distribute the updating software to the prescribed number of communication devices 1 equivalent to the number of communication devices 1 having completed in distribution according to a sequence of distribution. Accordingly, irrespective of the existence of numerous communication devices 1 serving as updated subjects, the distribution device 3 is able to distribute the updating software to all the communication devices 1 while controlling the concurrent distribution count of the updating software. As a result, the distribution device 3 is able to update the software with numerous communication devices 1 serving as updated subjects without affecting other communication devices 1 connected to the base station 2.

Second Embodiment

Distribution of Updating Software to Mobile Communication Device 1

Next, the second embodiment will be described below. The distribution device 3 of the first embodiment is configured to distribute the updating software to the communication device 1 which may not be moved in normal usage. In contrast, the second embodiment differs from the first embodiment in that the distribution device 3 of the second embodiment is configured to distribute the updating software to the immobile communication device 1 and the mobile communication device 1 (e.g. a GPS tracker configured to transmit its position information to a server through wireless communication networks). Hereinafter, differences than the first embodiment will be described below. The descriptions of the same parts as the first embodiment will be appropriately omitted here. In addition, the present embodiment refers to the updating software as the software used for controlling communication modules, which is provided by a communication carrier to establish connections to its own networks.

FIG. 8 shows a table describing the configuration of a distribution-queue DB according to the second embodiment. As shown in FIG. 8, the distribution-queue DB is configured to store the device type indicating whether or not the communication device 1 is a mobile one and the acquisition date indicating the date of acquiring the response information from the communication device 1 in connection with the communication-device ID and the base-station ID. For example, the device type is either "MOBILE" indicating the mobile communication device 1 or "FIXED" indicating the communication device 1 set up at the fixed location. For example, the device type is stored in the list information in connection with the communication-device ID in advance. The distribution device 3 is configured to store a distribution history of the updating software on the storage 32, wherein the distribution device 3 may determine the communication device 1 as "MOBILE" when the base station 2 attributed to the communication device 1 at the last time differs from the base station 2 ascribed to the distribution history. The present embodiment refers to the device type which is stored in advance in the list information in connection with the communication-device ID.

Before a lapse of a predetermined time after acquiring the base-station ID from the communication device 1, the information acquisition part 331 of the second embodiment reacquires the base-station ID of the base station 2 attributed to the communication device 1 when the distribution part 333 cannot start distributing the updating software to the communication device 1. When the predetermined time is set to "ten minutes", for example, the information acquisition part 331 retransmits a response request to the communication device 1 after a lapse of ten minutes from the acquisition date/time when it becomes ready to distribute the updating software to the communication device 1 having the record stored on the distribution-queue DB. Subsequently, when the communication device 1 receiving the response request transmits the response information, the information acquisition part 331 acquires the response information to thereby input into the determination part 332 the date/time of acquiring the response information as well as the communication-device ID and the base-station ID included in the response information.

Before reacquiring the base-station ID of the base station 2 attributed to the communication device 1, the information acquisition part 331 may determines a predetermined wait time based on the number of mobile communication devices 1 attributed to the base station 2. When the number of mobile communication devices 1 is larger than the number of fixed communication devices 1, for example, the information acquisition part 331 may determine shorter wait time than the wait time which is determined when the number of fixed communication devices 1 is larger than the number of mobile communication devices 1. On the other hand, the information acquisition part 331 may determine a longer wait time when the number of fixed communication devices 1 is larger than the number of mobile communication devices 1 than the wait time which is set when number of mobile communication devices 1 is larger than the number of fixed communication devices 1. Accordingly, it is possible for the information acquisition part 331 to increase the frequency of updating the communication-device IDs of the communication devices 1 attributed to the base station 2 connectible with a large number of mobile communication devices 1, and therefore it is possible to reduce a probability of distributing the updating software to the other base station 2 not attributed to the communication device 1.

The information acquisition part 331 may determine a predetermined wait time to stand by its operation before reacquiring the base-station ID of the base station 2 attributed to the communication device 1 based on the device type. For example, the information acquisition part 331 may determine a shorter wait time for the mobile communication device 1 than the wait time for the fixed communication device 1. On the other hand, the information acquisition part 331 may determine a longer wait time for the fixed communication device 1 than the wait time for the mobile communication device 1.

When the mobile communication device 1 is equipped with an acceleration sensor, the information acquisition part 331 may acquire the response information including the information of an acceleration measured by the acceleration sensor from the communication device 1, thus determining whether or not the communication device 1 is being moved based on the acceleration information. In this case, the information determination part 331 may determines a shorter wait time upon determining that the mobile communication device 1 is being moved than the wait time upon determining that the mobile communication device 1 is not moved. Accordingly, it is possible for the information acquisition part 331 to increase the frequency of updating the base-station ID of the base station 2 attributed to the "moving" communication device 1, and therefore it is possible to reduce a probability of distributing the updating software to the base station 2 not attributed to the communication device 1 by the distribution part 333.

On the condition that the communication device 1 is a mobile one, the information acquisition part 331 may reacquire the base-station ID of the base station 2 attributed to the communication device 1 a predetermined time before the timing to retransmit the updating software by the distribution part 333. Specifically, in a ready condition to transmit the updating software to the communication device 1 having the record stored on the distribution-queue DB, the information acquisition part 331 may reacquire the base-station ID of the base station 2 attributed to the communication device having the device type of "MOBILE". The information acquisition part 331 may reacquire the base-station ID of the base station 2 attributed to the communication device 1 on the condition that the communication device 1 is being moved. Accordingly, it is possible to prevent the information acquisition part 331 from reacquiring the base-station ID with respect to the fixed communication device 1 which may not change the base station 2 attributed thereto.

When a first base-station ID previously acquired by the information acquisition part 331 differs from a second base-station ID reacquired by the information acquisition part 331, the determination part 332 of the second embodiment may redetermine a sequence with respect to a first base station 2 attributed to the communication device 1 when the information acquisition part 331 acquires the first base-station ID and a second base station 2 attributed to the communication device 1 when the information acquisition part 331 acquires the second base-station ID.

Figure 9:
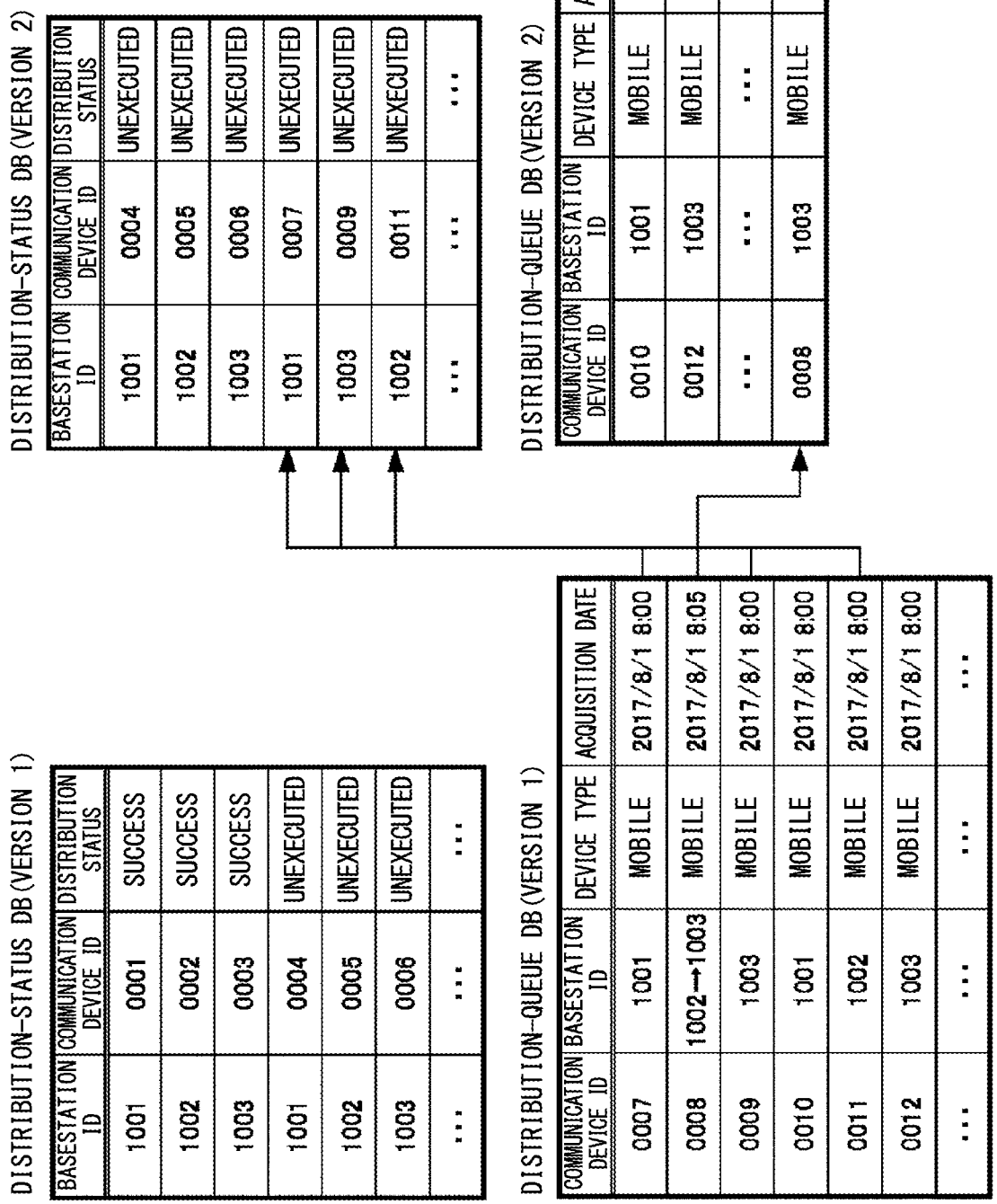
FIG. 9 shows tables used to explain a flow of processing to determine a distribution sequence according to the second embodiment.

FIG. 9 show tables used to explain a flow of processing to determine a distribution process according to the second embodiment. It is assumed as shown in the distribution-status DB of version 1 that, due to successful distribution of the updating software when three communication devices 1 have successfully received the updating software, the base station 2 attributed to the communication devices 1 becomes ready to distribute the updating software to a single communication device 1. In addition, it is assumed as shown in the distribution-queue DB of version 1 that the communication device 1 having the communication-device ID "0008" might have changed its connected base station 2 since the information acquisition part 331 reacquires the base-station ID from the prescribed number of communication devices 1 connected to the base station 2, which becomes lower than the threshold number of communication devices 1.

In this case, the determination part 332 changes the base-station ID, which is described in the record of the communication-device ID "0008", from the base-station ID "1002" to the base-station ID "1003". As a result, the base station 2 having the base-station ID "1002" changes the distribution sequence by deleting the communication-device ID "0008" as the communication device 1 subjected to distribution of the updating software. In addition, base station 2 having the base-station ID "1003" changes the distribution sequence by adding the communication-device ID "0008" as a new communication device 1 subjected to distribution of the updating software.

In this connection, the determination part 332 may change the sequence of the distribution-queue DB due to the movement of the communication device 1 having the communication-device ID "0008", for example, by adding the communication-device ID "0008" to the last end of a queue of the distribution-queue DB of version 2. The determination part 332 may redetermine the sequence such that the communication device 1 having changed its connected base station 2 can be added to the last end of a queue or a top position of a queue listing the communication devices 1 connected to the same base station 2.

To determine the sequence based on the acquisition date/time, the determination part 332 may resort the order of records stored on the distribution-queue DB based on the date/time of acquiring the second base-station ID different from the first base-station ID. For example, the determination part 332 may determine the sequence in the order from the oldest date/time of acquiring the second base-station ID.

The determination part 332 may redetermine the sequence of distributing the updating software to the communication devices 1 for each base station 2 by updating the sequence determined based on the first base-station ID due to a change of the base station 2 attributed to a certain communication device 1 to the second base-station ID different from the first base-station ID. Thereafter, the distribution part 333 extracts the records correlated to the communication devices 1 connected to the base stations having the base-station IDs "1001", "1002", "1003" among the records stored on the distribution-queue DB, thus storing the extracted records on the distribution-status DB of version 2. Next, the distribution part 333 starts to distribute the updating software to each of the base stations 2 attributed to the communication devices 1 having the communication-device IDs "0007", "0009", "0011" stored on the distribution-status DB.

Accordingly, it is possible for the determination part 332 to reduce a probability of distributing the updating software to the base station 2 not attributed to any communication devices 1 by the distribution part 333, and therefore it is possible to distribute the updating software according to the sequence determined based on the number of communication devices 1 which may be changed with respect to each base station 2.

The determination part 332 may determine the sequence at an earlier timing on the condition that the ratio of mobile communication devices 1 to multiple communication devices 1 connected to the base station 2 is less than a threshold value than the condition that the ratio of mobile communication devices 1 is equal to or above the threshold value. For example, the determination part 332 may determine the sequence at the preceding timing before the information acquisition part 331 acquires the base-station ID from the communication device 1 due to a very small number of mobile communication devices 1 relative to the majority of fixed communication devices 1. On the other hand, the determination part 332 may not determine the sequence at the preceding timing before the information acquisition part 331 acquires the base-station ID from the communication device 1 but may determine the sequence at the later timing after the information acquisition part 331 acquires the base-station ID due to a very small number of fixed communication devices 1 relative to the majority of mobile communication devices 1. Since the determination part 332 can determine the sequence in advance, it is possible for a manager of the distribution device 3 to forecast the period necessary to distribute the updating software.

The determination part 332 may determine the sequence after it becomes ready to distribute the updating software when the ratio of mobile communication devices 1 to multiple communication devices 1 connected to the base station 2 is equal to or above a threshold value. For example, the determination part 332 may not determine the sequence in advance but may determine the sequence based on the base-station ID which the information acquisition part 331 acquires from the communication device 1 due to a very small number of fixed communication devices 1 relative to the majority of mobile communication devices 1. Accordingly, it is possible for the determination part 332 to reduce a possibility of distributing the updating software to the base station 2 not attributed to any communication devices 1 by the distribution part 333.

Updating Process of Distribution-Status DB

Figure 10:
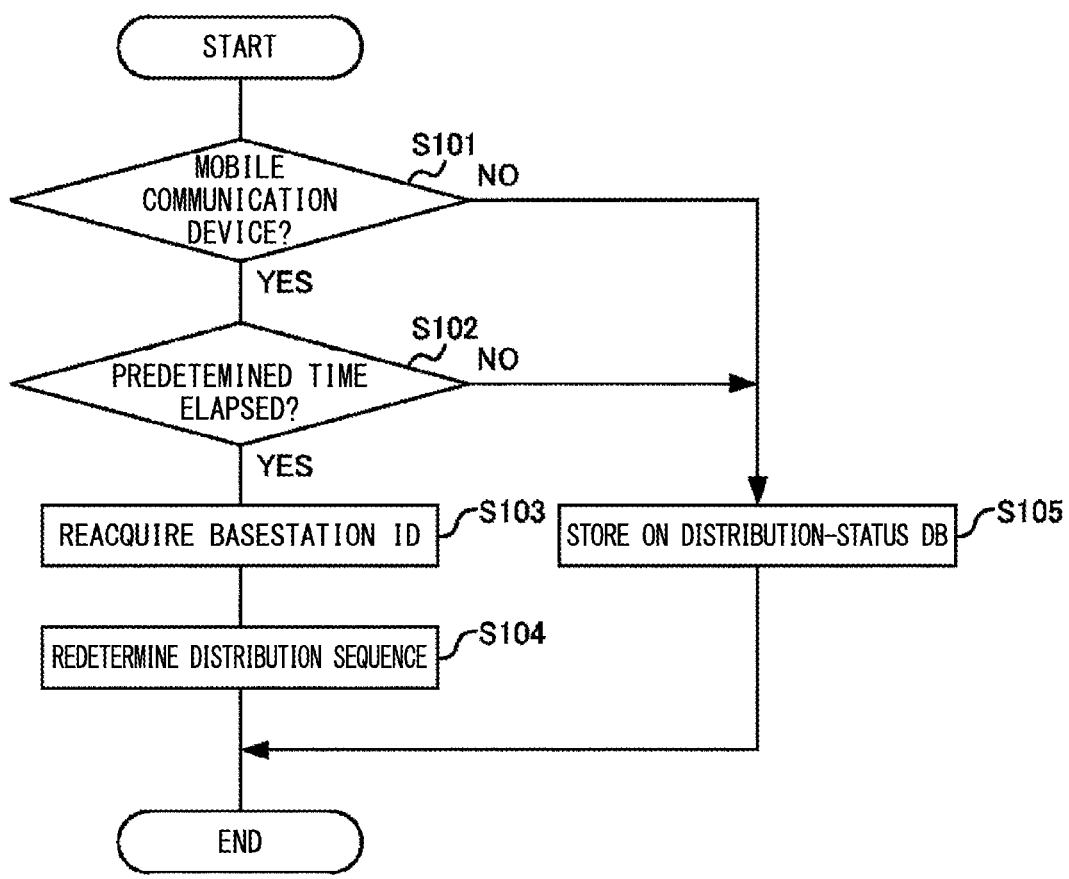
FIG. 10 is a flowchart showing a flow of a distribution-status database updating process executed by a distribution device according to the second embodiment.

Next, a flow of processing executed by the distribution device 3 will be described below. The processing executed by the distribution device 3 of the second embodiment differs from the foregoing processing in terms of a distribution-status DB updating process (S10) shown in FIG. 5, which will be solely described below. FIG. 10 is a flowchart showing the distribution-status DB updating process executed by the distribution device 3 of the second embodiment. The flowchart starts its steps subsequent to S9 of FIG. 5 or when triggered by the distribution part 33 to determine the existence of any records on the distribution-queue DB.

The information acquisition part 331 determines whether or not one or more communication devices 1 selected from among multiple communication devices 1 according to the sequence are mobile communication devices 1 (S101) upon a completion of distributing the updating software to one or more communication devices 1 among multiple communication devices while the distribution part 333 is distributing the updating software to the prescribed number of communication devices 1 equivalent to the threshold number of communication devices 1. Specifically, the information acquisition part 331 determines whether one or more records, which the distribution part 333 selects from among all the records stored on the distribution-queue DB, indicates the device type of "MOBILE" or "FIXED".

When the acceleration status is stored in connection with the record(s) stored on the distribution-queue DB, the information acquisition part 331 may determine whether the device type indicates "MOBILE" or "FIXED" based on a decision as to whether or not the acceleration status indicates movement in progress with respect to one or more records, which the distribution part 333 selects from among all the records stored on the distribution-queue DB. When the distribution history of the updating software is stored on the storage 32, the information acquisition part 331 may determine whether the device type indicates "MOBILE" or "FIXED" based on a decision as to whether or not the current base station 2 currently attributed to the communication device 1 differs from the previous base station 2 previously attributed to the communication device 1 having the record which is indicated by the distribution history among the records stored on the distribution-queue DB.

Upon determining the device type of "FIXED", the information acquisition part 331 proceeds to S105. On the other hand, upon determining the device type of "MOBILE", the information acquisition part 331 determines whether or not a predetermined time has elapsed after acquiring the base-station ID (S102).

Upon determining that the predetermined time has not elapsed after acquisition of the base-station ID, the information acquisition part 331 proceeds to S105. Upon determining a lapse of the predetermined time, the information acquisition part 331 reacquires the base-station ID from the communication device 1 (S103). Specifically, the information acquisition part 331 firstly transmits a response request to the communication device 1 having the record indicating a lapse of the predetermined time from the acquisition date/time among the records stored on the distribution-queue DB. Next, the information acquisition part 331 acquires the base-station ID included in the response information which is transmitted by the communication device 1 upon receiving the response request. The information acquisition part 331 acquires and inputs the communication-device ID, the base-station ID, and the acquisition date/time of the response information to the determination part 332.

The determination part 332 redetermines a distribution sequence based on the communication-device ID, the base-station ID, and the acquisition date/time input thereto from the information acquisition part 331 (S104). Specifically, the determination part 332 redetermines a sequence of distributing the updating software to the communication device(s) 1 for each base station 2 by updating the sequence determined based on the first base-station ID when the current base-station ID is changed to the second base-station ID different from the first base-station ID.

When the information acquisition part 331 determines the device type of "FIXED" in S101 or when the information acquisition part 331 determines that the predetermined time has not elapsed after acquisition of the base-station ID in S102, the distribution part 333 extracts a prescribed number of records ascribed to the communication devices 1 serving distributed subjects of the updating software from the distribution-queue DB without exceeding the threshold number of communication devices 1, thus storing the extracted records on the distribution-status DB (S105).

Effect of Second Embodiment

As described above, the distribution device 3 of the second embodiment is configured to reacquire from the communication device 1 the base-station ID of the base station 2 attributed to the communication device 1 when it is not possible to start distributing the updating software before a lapse of a predetermined time after acquiring the base-station ID from the communication device 1. Next, the distribution device 3 is configured to redetermine a sequence of distributing the updating software when the reacquired base-station ID differs from the previously-acquired base station ID. Accordingly, it is possible for the distribution device 3 to reflect a change of the base station 2 attributed to the mobile communication device 1 in the distribution sequence eve when it takes a long time to start distributing the updating software. As a result, it is possible for the distribution device 3 to reduce a probability of distributing the updating software to the base station 2 not attributed to any communication devices 1.

The aforementioned descriptions are made upon assuming that the distribution part 333 is configured to distribute the software according to the sequence determined by the determination part 332. In addition, the distribution part 333 may distribute the software from multiple base stations 2 to a plurality of communication devices 1, the number of which is equal to or below the threshold number, according to the sequence determined by the determination part 332 on the condition that the predetermined number or more of communication devices 1 may server as software-distributed subjects within a certain area including multiple base stations 2.

For example, the distribution part 333 may distribute the software to all the communication devices 1 serving as software-distributed subjects irrespective of the sequence determined by the determination part 332 when the number of communication devices 1 located in an area having a necessity of distributing software is equal to or less than the number of communication devices 1 to which a single base station 2 can concurrently distribute the software. On the other hand, the distribution part 333 may sequentially distribute the software according to the sequence determined by the determination part 332 when the number of communication devices 1 located in an area having a necessity of distributing software is larger than the number of communication devices 1 which a single base station 2 can concurrently distribute the software. Accordingly, it is possible to reduce the processing load of the distribution device 3 to distribute the software to the communication devices 1 located in an area having a small number of communication devices 1 serving as software-distributed subjects.

In this connection, it is possible to employ an arbitrary area determination method, for example, it is possible to determine an area based on the number of communication devices 1 when the communication devices 1 are dispersed nationwide comprehensively. To prevent an excessively heavy load of a single distribution device 3 used to distribute the software to all the communication devices 1 nationwide, the determination part 332 may determine a sequence of software-distributed areas such that the distribution part 333 can distribute the software according to the determined sequence.

In addition, concentration of many communication devices 1 at a specific area (e.g. a Kanto region in Japan) may arise a fear that the base station 2 may be occupied in its resources by distribution of software. To repress the fear, the distribution device 3 may divide the number of communication devices 1 serving as software-distributed subjects located at a specific area into a plurality of groups so as to sequentially distribute the software to a plurality of groups. In this case, the determination part 332 may determine a distribution sequence for each group of communication devices 1. Accordingly, it is possible to reduce loads with both the distribution device 3 and the base station(s) 2.

Heretofore, the present invention has been described by way of embodiments, whereas the technical scope of protection sought for the present invention is not necessarily limited to the technical scope of the foregoing embodiments; hence, it is possible to provide any modifications or changes within the subject matter of the invention. For example, the foregoing embodiments are not restrictive in terms of concrete examples of decentralizing or integrating devices, and therefore it is possible to functionally or physically decentralize or integrate the entirety or part of devices in arbitrary units. In addition, it is possible to provide new embodiments made up of arbitrary combinations of foregoing examples, which can be embraced within the foregoing embodiments of the present invention. Herein, new embodiments made up of arbitrary combinations of foregoing examples may share the advantageous effects realized by the original embodiments.

REFERENCE SIGNS LIST 1 communication device
2 base station
3 distribution device
31 communication part
32 storage
33 controller
331 information acquisition part
332 determination part
333 distribution part

The invention claimed is:

1. A distribution device configured to distribute software through a plurality of base stations each connectible to a plurality of communication devices over a wireless communication network, said distribution device comprising:
an information acquisition part configured to acquire device identification information of a communication device subjected to distribution of the software among the plurality of communication devices and base-station identification information of a base station attributed to the communication device among the plurality of base stations over the wireless communication network from the communication device;
a determination part configured to determine a sequence of distributing the software to a threshold number or less of communication devices among the plurality of communication devices connectible to the base station based on a plurality of device identification information used to identify the threshold number or less of communication devices and the base-station identification information of the base station; and
a distribution part configured to distribute the software through the base station to the threshold number or less of communication devices among the plurality of communication devices according to the sequence determined by the determination part.

2. The distribution device according to claim 1, wherein upon a completion of distributing the software to one or more communication devices among the plurality of communication devices in an attempt to distribute the software to the threshold number or less of communication devices, the distribution part starts to distribute the software to one or more communication devices selected from among the plurality of communication devices according to the sequence.

3. The distribution device according to claim 1, wherein the distribution part is configured to determine the threshold number based on the size of the software.

4. The distribution device according to claim 1, wherein the distribution part is configured to determine the threshold number based on a time to distribute the software.

5. The distribution device according to claim 1, wherein the distribution part is configured to determine the threshold number based on the type of the base station.

6. The distribution device according to claim 1, wherein when the distribution part is unable to start distributing the software to the communication device before a predetermined time lapses after acquisition of the base-station identification information from the communication device, the information acquisition part is configured to reacquire the base-station identification information of the base station attributed to the communication device.

7. The distribution device according to claim 6, wherein when first base-station identification information previously acquired by the information acquisition part differs from second base-station identification information reacquired by the information acquisition part, the determination part redetermines the sequence with respect to a first base station which is attributed to the communication device when the information acquisition part acquires the first base-station identification information and a second base station which is attributed to the communication device when the information acquisition part acquires the second base-station identification information.

8. The distribution device according to claim 6, wherein when the communication device is a mobile communication device, the information acquisition part is configured to reacquire the base-station identification information of the base station attributed to the communication device before distribution of the software by the distribution part by a predetermined time.

9. The distribution device according to claim 8, wherein the information acquisition part is configured to determine the predetermined time based on a number of mobile communication devices connectible to the base station.

10. The distribution device according to claim 1, wherein the determination part is configured to determine the sequence at an earlier timing when a ratio of mobile communication devices to the plurality of communication devices connectible to the base station is less than a threshold value rather than when the ratio of mobile communication devices is equal to or above the threshold value.

11. The distribution device according to claim 10, wherein the determination part is configured to determine the sequence after a ready to distribute the software when the ratio of mobile communication devices to the plurality of communication devices connectible to the base station is equal to or above the threshold value.

12. The distribution device according to claim 1, wherein when a predetermined number or more of communication devices serving as software-distributed subjects is located in a predetermined area covering the plurality of base stations, the distribution part is configured to distribute the software through the plurality of base stations to the threshold number or less of communication devices according to the sequence determined by the determination part.

13. The distribution device according to claim 1, wherein the distribution part is configured to distribute the software at a timing at which the communication device does not execute a predetermined application.

14. A distribution method configured to distribute software through a plurality of base stations each connectible to a plurality of communication devices over a wireless communication network, said distribution method comprising:

acquiring device identification information of a communication device subjected to distribution of the software among the plurality of communication devices and base-station identification information of a base station attributed to the communication device among the plurality of base stations over the wireless communication network from the communication device;

determining a sequence of distributing the software to a threshold number or less of communication devices among the plurality of communication devices connectible to the base station based on a plurality of device identification information used to identify the threshold number or less of the communication devices and the base-station identification information of the base station; and distributing the software through the base station to the threshold number or less of the communication devices among the plurality of communication devices according to the determined sequence.

* * * * *